Figure 1:
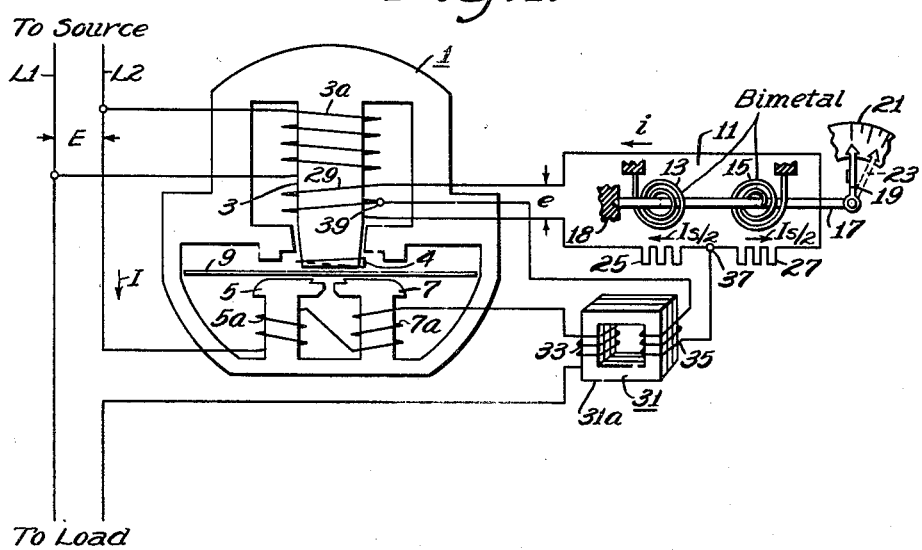

Sept. 12, 1950     A. J. PETZINGER     2,521,869
DEVICE AND METHOD FOR MEASURING WEIGHTED SUM
OF REAL AND REACTIVE ELECTRICAL POWER
Filed Sept. 20, 1947

INVENTOR
Ambrose J. Petzinger.
BY
ATTORNEY

Patented Sept. 12, 1950

2,521,869

UNITED STATES PATENT OFFICE 2,521,869

DEVICE AND METHOD FOR MEASURING WEIGHTED SUM OF REAL AND REACTIVE ELECTRICAL POWER

Ambrose J. Petzinger, Fair Lawn, N. J., assignor to Westinghouse Electric Corporation, East Pittsburgh, Pa., a corporation of Pennsylvania Application September 20, 1947, Serial No. 775,273

5 Claims. (Cl. 171—309)

This invention relates to electrical measuring devices and it has particular relation to devices for measuring the sum of real and reactive power weighted in accordance with predetermined weighting and for integrating real power.

In preparing rate schedules, attention has been given to the consumption by the customer of reactive power as well as real power. For example, volt-ampere meters have been employed for measuring the vector sum of real and reactive power. In addition, separate real and reactive power meters have been employed.

It is also possible to prepare a rate schedule wherein a charge is based on real energy consumption represented by kilowatt-hours and a further charge is based on the demand for the sum of real and reactive power properly weighted in accordance with the relative cost of real and reactive power.

In accordance with the invention, a compact unit is provided for integrating the real power supplied to a load. In addition, the unit includes a measuring device for measuring the demand of real and reactive power weighted in accordance with a predetermined weighting. In a preferred embodiment of the invention, the demand is measured by a thermal demand wattmeter which derives current energization through a transformer. This transformer has a substantial phase displacement which is adjusted to provide the desired weighting of the real and reactive power components to be measured. Conveniently, voltage energization for the thermal demand wattmeter may be derived from a voltage winding of the integrating meter.

It is, therefore, an object of the invention to provide an improved measuring device for measuring the sum of real and reactive power supplied to a load and for properly weighting the real and reactive power components to be measured.

It is another object of the invention to provide a thermal wattmeter which derives current energization through a transformer having a substantial angle of phase displacement.

It is also an object of the invention to provide a thermal demand wattmeter as stated in the preceding paragraph in combination with an integrating watthour-meter, wherein the voltage winding of the watthour-meter supplies voltage energization for the thermal demand wattmeter.

It is a further object of the invention to provide an improved method for measuring the sum of real and reactive power supplied to a load and for properly weighting the real and reactive power components to be measured.

Figure 2:
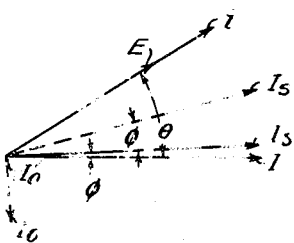

Other objects of the invention will be apparent from the following description taken in conjunction with the accompanying drawing, in which:

Figure 1 is a schematic view with parts shown in elevation and parts shown in perspective of an electrical system embodying the invention; and Fig. 2 is a diagrammatic view showing certain vector relationships.

Referring to the drawing, Figure 1 shows an electrical circuit represented by conductors L1 and L2 for supplying electrical energy from a source to a load. Although the circuit may be single phase or polyphase and may operate at any desired frequency, it will be assumed for the purpose of discussion that the circuit is a single phase alternating-current circuit operating at a phase frequency of 60 cycles per second.

For the purpose of measuring energy supplied by the source to the load, an integrating watthour meter 1 of conventional construction is associated with the circuit. The portions of the watthour meter illustrated include a magnetic structure having a voltage pole 3 and current poles 5 and 7 which are spaced to define an air gap within which an electroconductive disc or armature 9 is mounted for rotation. A voltage winding 3a is associated with the voltage pole 3 and current windings 5a and 7a are associated with the current poles 5 and 7. As well understood, magnetic flux entering the air gap from the voltage pole 3 is lagged correctly by a lagging winding 4. When properly energized, these windings produce a shifting magnetic field in the air gap containing the armature 9 to produce rotation of the armature. It will be understood that a conventional damping magnet (not shown) would be associated with the armature 9 to damp rotation thereof. A conventional watthour meter register (not shown) may be driven by the armature 9 for the purpose of integrating electrical energy supplied by the source to the load.

The measuring unit of Fig. 1 includes not only the integrating watthour-meter 1 by a demand meter 11 which conveniently may be of the thermal type. As illustrated in Fig. 1, the thermal demand meter 11 may include two thermomotive units such as spiral bimetallic springs 13 and 15. These spiral springs have their inner ends connected to a shaft 17 which is mounted for rotation with respect to a stator structure 18. The outer ends of the spiral springs are connected to the stator structure. The spiral springs are wound in opposite directions about the shaft 17. Consequently, the shaft 17 is rotated in accordance with the difference in the heating of the two springs. The shaft 17 carries a pointer 19 for rotation about a scale 21. A maximum demand pointer 23 may be disposed for actuation by the pointer 19 to a position corresponding to the maximum displacement of the pointer 19 in a manner well understood in the art.

Heating of the bimetallic springs 13 and 15 may be effected by passing current directly therethrough, or by providing one or more separate heaters for each of the springs. In the specific embodiment of Fig. 1, resistance heaters 25 and 27 are provided for the respective springs 13 and 15. These heaters are connected in series for energization in accordance with the voltage E of the circuit represented by the conductors L1 and L2. Conveniently, such energization may be derived from a winding 29 which is wound around the voltage pole 3 and which is inductively coupled to the voltage winding 3a of the watthour meter. Consequently, the winding 29 constitutes the secondary winding of a transformer wherein the voltage winding 3a is the primary winding. The secondary voltage output e is applied to the heaters 25 and 27 in series to direct a current i therethrough. The meters 1 and 11 may be similar in construction to those shown in the Vassar Patent 2,323,739.

The heaters 25 and 27 also are energized in accordance with the line current I flowing in the circuit represented by the conductors L1 and L2. To this end, a current transformer 31 has its primary winding 33 connected in series with the current windings 5a and 7a for energization by the line current I. The current transformer 31 has a secondary winding 35 having one end connected to a terminal 37 intermediate the two heaters 25 and 27 and having a second end connected to a center tap 39 on the winding 29. Assuming that the current transformer 31 has a turn ratio of unity, the heaters 25 and 27 are in effect connected in parallel for energization by the line current I. Consequently, one half of the line current would flow through each of the heaters adding vectorially to the current i in the heater 27 and subtracting vectorially from the current i in the heater 25.

If the current transformer 31 were a conventional current transformer having little phase displacement error, the integrating meter 1 and the thermal demand meter 11 would operate substantially in the same manner as the corresponding meters discussed in the aforesaid Vassar patent. However, in order to obtain a reading from the thermal demand meter 11 representative of the sum of the real and reactive power supplied by the source to the load weighted in accordance with a predetermined weighing, the system of Fig. 1 is designed to provide a phase displacement between the secondary output voltage e of the winding 29 and the secondary output current $I_s$ of the winding 35 when the associated electrical circuit is operating at unity power factor. Although the voltage e derived from the secondary winding 29 could be shifted with respect to the line voltage E, preferably the desired phase relationships are established by adjustment of the phase displacement between the primary and secondary currents of the transformer 31. These phase relationships may be discussed with reference to Fig. 2.

For the vector diagram of Fig. 2, it is assumed that the line voltage E leads the line current I by an angle $\theta$. Since the current transformer 31 has a resistive load represented by the heaters 25 and 27, the secondary current $I_s$ is almost in quadrature with the exciting current $I_0$ of the current transformer and adds vectorially thereto to equal the primary current I. It will be recalled that the current transformer 31 has a large exciting current. Consequently, the secondary current $I_s$ leads the line current I by a large angle $\phi$. If the current transformer were of conventional construction, it would have had a small exciting current $I'_0$, producing a secondary current $I'_s$ which would be almost in phase with the line current I. The slight phase displacement between the currents $I'_s$ and I is represented by an angle $\phi'$.

The desired angle of phase displacement between the line current and the secondary current of the current transformer may be obtained by proper selection of the steel employed in the laminations of the magnetic core 31a of the current transformer and by proper adjustment of the number and types of laminations employed. The effect of the magnetic properties of the steel on exciting current is well known in the art. For example, a steel providing a small exciting current is represented by the following composition by weight:

| | Per cent |
|---|---|
| Silicon | 3.5 |
| Iron | 96.5 |

Orientation of steel giving improved magnetic properties in the direction of magnetization assists in reducing exciting current. As a further example, a steel providing a substantially larger exciting current may have the following composition:

| | Per cent |
|---|---|
| Silicon | 0.5 |
| Iron | 99.5 |

If desired, the magnetic core of the transformer may be constructed of laminations of either of the foregoing steels or various combinations of two types of laminations may be employed to provide the desired value of exciting current.

The present understanding of the theory underlying the performance of the measuring unit disclosed in Fig. 1 now may be set forth. Referring to Fig. 2, it will be observed that the thermal demand meter 11 of Fig. 1 provides a reading R which is represented by the following expression:

$$R = EI \cos(\theta - \phi) \quad (1)$$

By trigonometric identities, Equation 1 may be expanded as follows:

$$R = EI \cos(\theta - \phi)$$
$$= EI (\cos\theta \cos\phi + \sin\theta \sin\phi) \quad (2)$$

If it is assumed that $$\frac{\sin\phi}{\cos\phi} = \tan\phi = A$$

Equation 2 may be rewritten as follows:

$$R = EI \cos\phi (\cos\theta + A\sin\theta)$$
$$= \cos\phi \, (\text{real power} + A \times \text{reactive power}) \quad (3)$$

A study of Equation 3 will show that the reading of the thermal demand meter 11 is proportional to the sum of real and reactive power weighted in accordance with the weighting factor A. By proper selection of the factor A, any desired relative weighting can be given to the real and reactive power. It will be understood that the value assigned to the factor A determines the value of the angle $\phi$. However, once assigned, the angle $\phi$ is a constant and the scale 21 of the thermal demand meter 11 may be calibrated to read the desired sum of real and reactive power properly weighted. For such meters, the factor $\cos \phi$ is only slightly less than unity in virtually all cases. Consequently, compensation for the factor $\cos \phi$ in the calibration of the meter may be unnecessary for many applications.

The foregoing discussion may be further clarified by a specific example. Let it be assumed that the cost of supplying real power to a load is six times the cost of supplying reactive power thereto. This means that the factor $$A = \frac{1}{6}$$

Since $$\tan \phi = A = \frac{1}{6}$$

it follows that the angle $\phi = 9° 28'$. Consequently, if the current transformer 31 is adjusted to provide an angle $\phi$ of phase displacement between its primary and secondary currents having a value of 9° 28', from Equation 3, the thermal demand meter 11 measures a quantity represented by the following expression:

$$R = EI \ (\cos 9° 28') \left( \cos \theta + \frac{1}{6} \sin \theta \right) \quad (4)$$

From Equation 4, it is clear that the thermal demand meter 11 provides a demand reading of the sum of real and reactive power properly weighted for billing purposes. Inasmuch as $\cos 9° 28' = .986$ in Equation 4 is a constant, the scale 21 of the thermal demand meter may be calibrated to indicate directly the desired resultant quantity. If desired, the factor $\cos 9° 28'$ may be assumed to equal unity with slight error. At the same time, the integrating watthour-meter 1 provides the integrated kilowatt hours to complete the information required for billing purposes.

The phase displacement of the current transformer herein provided is of a completely different order from the phase displacement of conventional transformers. The latter are discussed in the Electrical Metermen's Handbook, fifth edition, 1940, published by Edison Electric Institute, New York city. Since $$\tan 2° = \frac{1}{28}$$

which is well below the weighting factor required by electrical systems, it follows that values of $\phi$ in excess of 2° ordinarily would be employed. Values of $A$ for conventional systems may vary from about ¼ to about 1/15 (depending mostly on methods of allocating costs of each utility. Otherwise, the range would be much smaller).

By overlagging the watthour meter 1, the meter can be adjusted to integrate the quantity $EI \cos (\theta - \phi)$, wherein $\phi$ represents the amount of overlag. Inasmuch as the cost ratios of reactive power to real power usually differ for energy and demand, different values of $\phi$ ordinarily would be selected for the meter 1 and the thermal demand meter.

Although the invention has been described with reference to certain specific embodiments thereof, numerous modifications thereof are possible.

I claim as my invention:

1. In a measuring unit responsive to the sum of real and reactive power in an alternating-current circuit weighted in accordance with a predetermined relative weighting, a measuring device responsive when energized to the product and phase displacement of voltage and current of an alternating circuit, said measuring device comprising a meter having current terminals and having voltage terminals, and a current transformer having a secondary winding connected to said current terminals for supplying energy to said measuring device, said transformer having an exciting current which is a large percentage of the rated primary current of the transformer to provide a substantial phase displacement for establishing said relative weighting.

2. A measuring unit as defined in claim 1, in combination with an integrating alternating-current meter having a voltage winding, and a secondary winding inductively coupled to said voltage winding for supplying energy to said voltage terminals.

3. A measuring unit as defined in claim 1, wherein said meter comprises a thermal meter having a pair of resistance heater units connected to said terminals for energization respectively in accordance with the sum and difference of current and voltage applied to the terminals, and translating means differentially responsive to heat generated by said heater units, said current transformer having an angle of phase displacement between primary and secondary currents in excess of 2°.

4. A method of obtaining a resultant quantity representing the sum of real and reactive power of an alternating-current circuit weighted in accordance with a predetermined finite relative weighting which comprises adjusting a current transformer to provide a phase displacement between primary input and secondary output representative of said relative weighting, connecting for energization from the alternating-current circuit, through the transformer, current terminals of a measuring instrument responsive to the product and phase displacement of voltage and current, and connecting voltage terminals of the measuring instrument for energization from the alternating-current circuit.

5. A method as defined in claim 4, wherein said adjustment is effected by loading the transformer resistively, and adjusting the exciting current of the transformer to a value sufficient to produce the desired weighting.

AMBROSE J. PETZINGER.

REFERENCES CITED

The following references are of record in the file of this patent:

UNITED STATES PATENTS

| Number | Name | Date |
|---|---|---|
| 623,526 | Duncan | Apr. 25, 1899 |
| 1,620,126 | Paine | Mar. 8, 1927 |